April 28, 1953 S. C. BARONE 2,636,421
DUPLICATING ENGRAVING MACHINE
Filed Feb. 10, 1950 2 SHEETS—SHEET 2
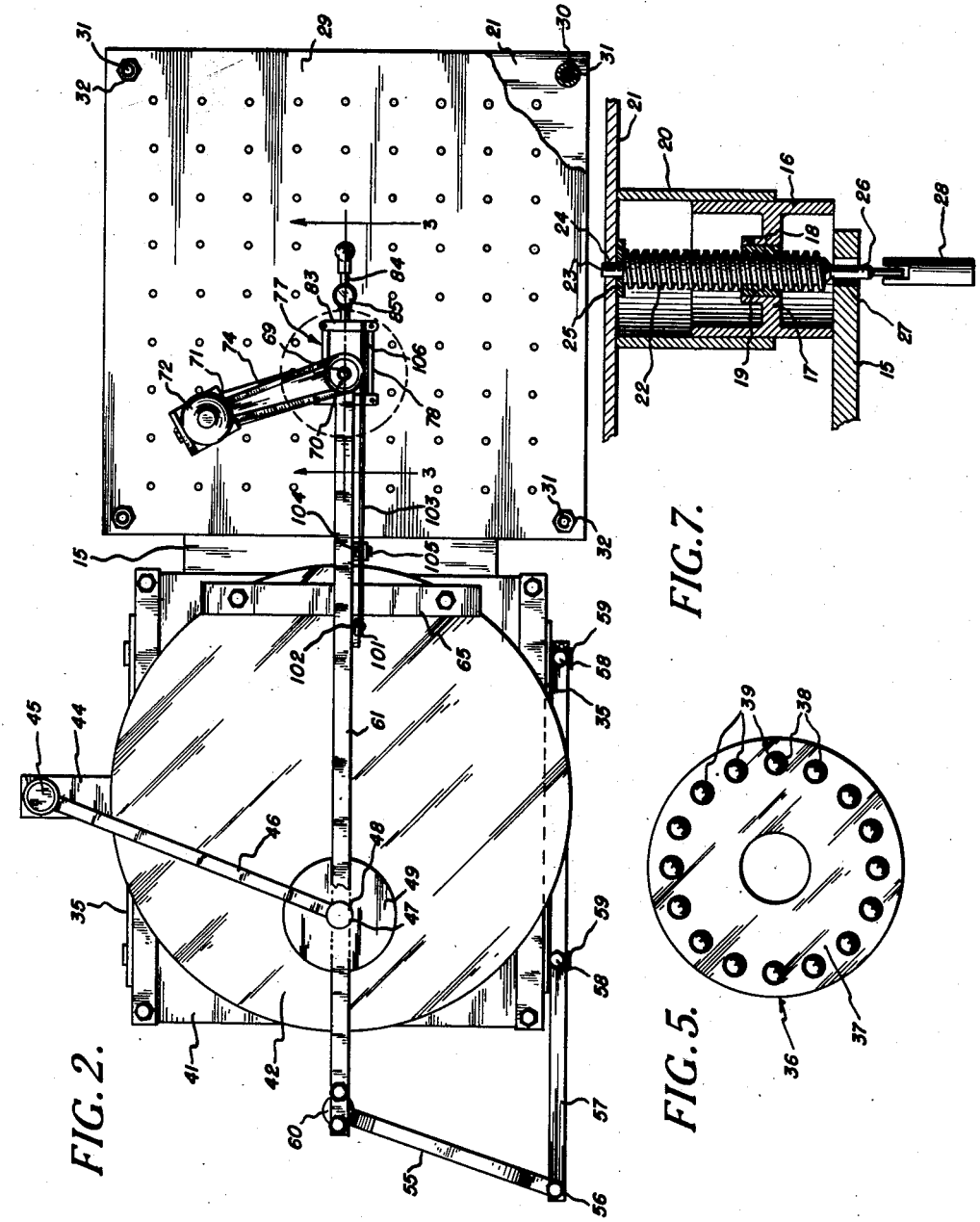
INVENTOR.
SAUL C. BARONE
BY
McMorrow, Burman + Davidson
ATTORNEYS Patented Apr. 28, 1953

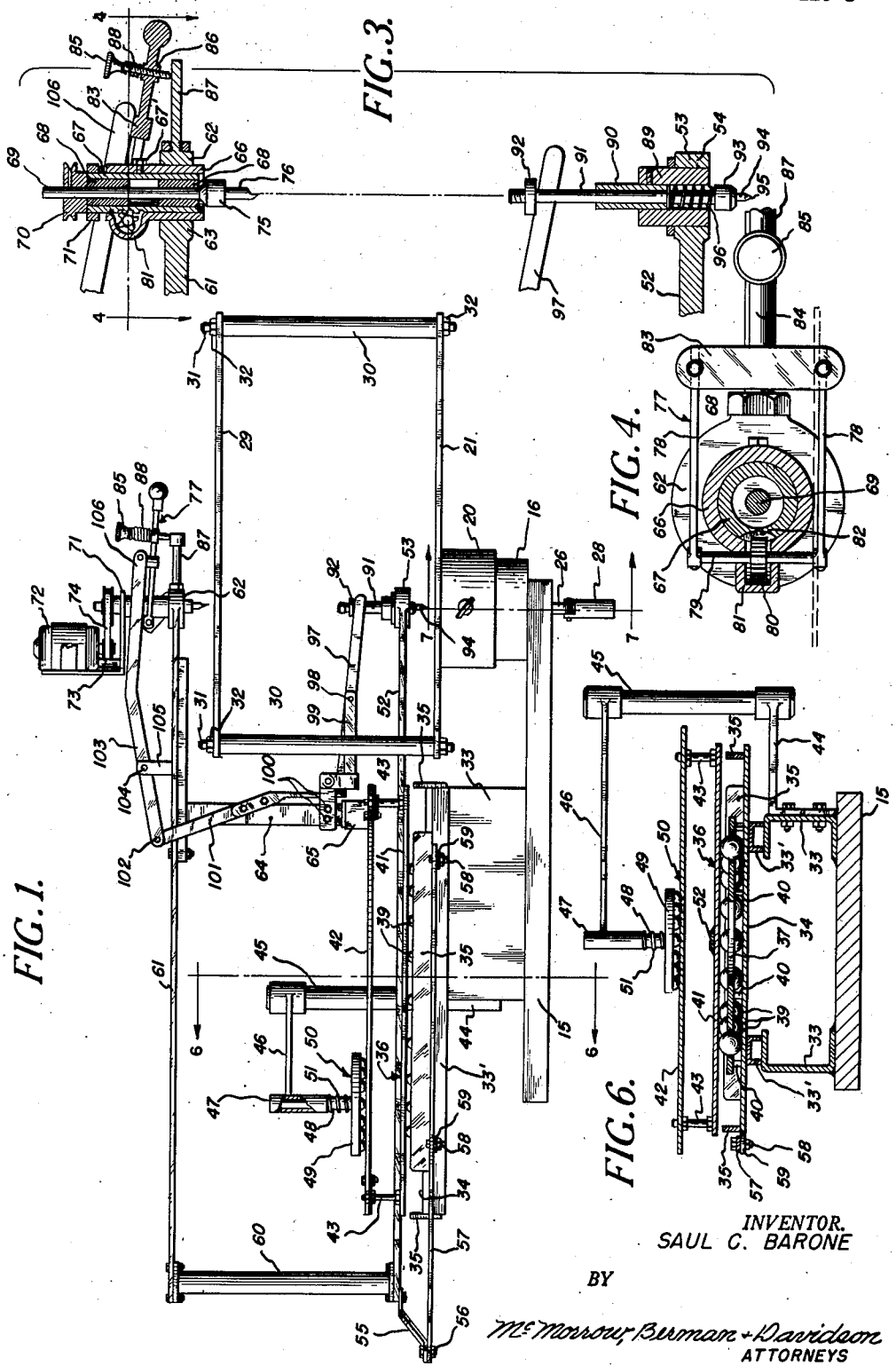

2,636,421

UNITED STATES PATENT OFFICE 2,636,421

DUPLICATING ENGRAVING MACHINE

Saul C. Barone, Petaluma, Calif.

Application February 10, 1950, Serial No. 143,579

2 Claims. (Cl. 90—13.1)

My invention relates to a duplicating engraving machine.

A primary object of my invention is to provide a machine to facilitate duplicating or copying steel engravings and the like.

A further object of the invention is to provide a machine of the above-mentioned character which is highly simplified, compact, sturdy and light weight in construction.

A further object is to provide a duplicating engraving machine including novel means for regulating the depth of cut of the engraving tool.

A further object is to provide a machine of the above-mentioned character including a novel and highly simplified linkage between the tracing and engraving tools.

A still further object of my invention is to provide a machine of the above-mentioned character including novel means which permit the tracing and engraving tools to be freely shifted in any direction in a horizontal plane, while preventing the tools from shifting axially or normal to the work.

Other objects and advantages of my invention will be apparent during the course of the following description.

In the accompanying drawings forming a part of this application, and in which like numerals are employed to designate like parts throughout the same:

Figure 1 is a side elevational view of a duplicating machine embodying my invention;

Figure 2 is a plan view of the same;

Figure 3 is an enlarged, fragmentary, vertical section taken on line 3—3 of Figure 2;

Figure 4 is an enlarged, horizontal, fragmentary, sectional view taken on line 4—4 of Figure 3;

Figure 5 is a plan view of a ball bearing spacer plate;

Figure 6 is a transverse, vertical sectional view taken on line 6—6 of Figure 1; and Figure 7 is an enlarged, fragmentary, vertical sectional view taken on line 7—7 of Figure 1.

In the drawings, where, for the purpose of illustration, is shown a preferred embodiment of my invention, the numeral 15 designates a horizontal support or base plate adapted to be fixedly secured to the top of a work bench, table or any other suitable support.

Rigidly mounted upon one end of the base plate 15 and projecting above the same is a relatively stationary, inner, vertical cylindrical sleeve 16 permanently rigidly secured to the top of the base plate by welding or the like. The sleeve 16 includes on internal, annular web or flange 17 having a central, axial bore 18 within which is fixedly and removably mounted an internally screw-threaded bushing or bearing 19. Axially slidably mounted upon the relatively stationary sleeve 16 is an outer, cylindrical tube or sleeve 20 having its top end permanently rigidly secured by welding or the like to the bottom of a flat, horizontal, rectangular plate 21 constituting the tracing table. A vertically disposed screw shaft 22 extends through the sleeves 16 and 20, as shown, and has screw-threaded engagement within the bushing 19. This screw shaft 22 has a top, reduced, cylindrical extension 23 extending rotatably through an opening 24 formed in the tracing table 21. A thrust washer or bearing 25 may be arranged between the top end of the screw shaft 22 and the bottom face of the table 21. The screw shaft 22 further includes a bottom, reduced extension 26 extending rotatably through a small opening 27 in the base plate 15 and below the base plate. A swivel handle 28 is carried by the bottom end of the extension 26 and is used for turning the screw shaft 22 to shift the outer sleeve 20 axially in either direction upon the inner sleeve 16 for raising and lowering the tracing table 21.

The device further comprises an engraving table 29 which is in the form of a flat and rectangular plate spaced vertically above the tracing table 21, and disposed in superposed relation with respect thereto. Corner, tubular spacers 30 maintain the tables 21 and 29 spaced apart, and elongated, vertical, screw-threaded rods 31 extend through the spacers 30 and through openings in the corners of the tables 21 and 29. Nuts 32 are mounted upon the opposite ends of the rods 31 and secure the tables 21 and 29 together as a rigid unit. The engraving table 29 is disposed horizontally and parallel to the tracing table 21. By manipulating the swivel handle 28, the tables 21 and 29 may be shifted together vertically as a unit.

Rigidly mounted upon the top of the base plate 15 and spaced from one end of the tables 21 and 29, as shown in Figure 1, is a bearing assembly comprising a pair of longitudinal, laterally spaced, upstanding channel members or mounting brackets 33 having their tops disposed at the same elevation. Rigidly mounted upon the brackets 33 are elongated, horizontal channel bars 33' which extend beyond the left ends of the brackets 33, remote from the tables 21 and 29. Rigidly mounted upon the tops of the channel bars 33' by any suitable means is a flat, rectangular horizontal base plate 34. The base plate 34 is disposed substantially at the same elevation as the tracing table 21. Rigidly secured to the base plate 34 by welding or the like, and arranged adjacent to the marginal edges thereof are longitudinally elongated, narrow, upstanding bumper strips or stops 35 for a purpose to be described.

Mounted upon the top of the base plate 34 and arranged inwardly of the bumper strips 35 thereof, is a thin, flat horizontal ball bearing 36 including a spacer plate 37 which is flat and circular, and is provided with a plurality of circumferentially spaced openings 38 countersunk upon both sides of the spacer plate 37, as shown. Balls 39 are arranged within the openings 38 of the spacer plate, and these balls project above and below the spacer plate 37, as shown. The balls 39 are freely rotatable and roll upon the base plate 34. The spacer plate 37 is provided with a plurality of circumferentially spaced, depending, short legs or pegs 40 rigidly secured thereto and being slidable upon the base plate 34. The pegs 40 maintain the spacer plate 37 spaced from the base plate 34, but permit the ball bearing 36 to shift freely over the surface of the bearing plate 41, as required. The spacer plate 37 is disposed slightly below the tops of the bumper strips 35, and such bumper strips will engage the spacer plate 37 to maintain the ball bearing 36 within the confines of the base plate 34.

A flat, rectangular bearing plate 41 which rests upon the balls 39 of the ball bearing 36 so that it may be shifted horizontally in any direction, may be of substantially the same size as the stationary bearing plate 34. The bottom of the plate 41 is disposed at an elevation slightly above the bumper strips 35, so that the plate 41 may be shifted horizontally beyond the bumper strips. A flat, circular, horizontal bearing plate 42 is arranged above the plate 41 and in spaced, superposed relation with respect thereto. The plates 41 and 42 are maintained spaced apart vertically and connected together as a horizontally shiftable unit by spacer bolts 43 or the like. The diameter of the circular plate 42 is preferably substantially equal to the width of the rectangular plate 41.

A rigid, L-shaped bracket 44 is bolted or otherwise rigidly secured to one of the channel members 33, as shown, at a point slightly below the base plate 34. This bracket 44 projects radially beyond the periphery of the plate 42, Figure 6, and an upstanding, rigid post 45 is rigidly secured to the outer end of bracket 44 and extends above the plate 42, as shown. A horizontal, generally radially extending arm 46 is rigidly secured to the top of the post 45 and projects inwardly of the post and over the plate 42. Rigidly secured to the inner end of the arm 46 is a vertical, depending tube or sleeve 47 having a vertical bore slidably receiving therein a vertical stem or shaft 48 of a ball bearing housing 49. A ball bearing 50 similar to the ball bearing 36 is mounted within the bearing housing 49, and this ball bearing 50 engages upon the top of the horizontally shiftable bearing plate 42. The ball bearing 50 is confined within the housing 49 and the unit comprising the tables 41 and 42 is freely horizontally shiftable between the bearings 36 and 50. An expansible coil spring 51 surrounds the stem or shaft 48 between the housing 49 and sleeve 47, and this spring serves to urge the housing 49 and ball bearing 50 into constant contact with the plate 42. In this manner, the plates 41 and 42 are freely shiftable horizontally, as previously stated, but they cannot be displaced vertically during their horizontal shifting movement.

A horizontally disposed, straight, elongated bar 52 is bolted, welded or otherwise rigidly secured to the top of the plate 41 and projects beyond both sides of the plate 41, as shown in Figure 1. One end of the bar 52 projects over the tracing plate or table 21 and is spaced above the same, as shown. At its end adjacent to the table 21, the bar 52 is provided with an integral sleeve or head 53 having a vertical bore 54. The opposite end of the bar 52 likewise projects beyond the edge of the table or plate 41 remote from the table 21, Figure 1, and at such end the bar 52 is pivotally connected with a horizontally swingable, downwardly inclined link or connecting rod 55 having its lowermost end pivotally connected, as at 56, with an elongated, horizontal, fixed bar 57 disposed adjacent to the forward edge of the bearing plate 34 and rigidly secured thereto by bolts or the like 58 which extend through the bar 57 and through apertured lugs 59 formed upon the adjacent edge of the bearing plate 34. The bar 57 is thus fixed and extends longitudinally of the base plate 15. An upstanding post 60 is rigidly mounted upon the top of the bar 52 near the end of the bar which is pivoted to the member 55. The top of this post 60 extends slightly above the elevation of the top of the engraving plate or table 29, Figure 1. A straight, elongated bar 61 is rigidly secured to the top end of the post 60 and extends horizontally and parallel to the bar 52. The inner end of the bar 61 is provided with an integral sleeve or head 62 having a vertical bore 63 arranged in alignment with the bore 54. The head 62 is disposed above the engraving plate or table 29. An intermediate post or bar 64 is disposed between the ends of the bar 61 and the top end of the bar or post 64 is rigidly secured to the bar 61. The lower end of the bar or post 64 is rigidly mounted upon a horizontal, inverted, U-shaped bracket 65, in turn rigidly mounted upon the horizontally shiftable plate 42. It is thus seen that the bars 61 and 52 form a substantially rigid frame, together with the posts 60 and 64, and such frame through the bar 52 is rigidly connected with the tables or plates 41 and 42 for horizontal movement with them. The tables or plates and the frame are pivotally connected with the fixed bar 57 through the pivoted link 55. As previously stated, the link 55 is freely swingable horizontally, and the link serves to limit the movement of the plates 41 and 42, together with the frame including the bars 52 and 61.

Rigidly mounted within the bore 63 of the head 62 is a fixed sleeve 66 slidably receiving therein a vertically reciprocatory sleeve or bearing 67. The reciprocatory sleeve 67 has rigidly mounted within its bore a pair of axially spaced bushings 68, and freely rotatably journaled within the bushings 68 is a vertical spindle 69 having a grooved pulley 70 fixedly secured thereto adjacent to the top end of the reciprocatory sleeve 67, Figure 3. As shown in Figure 3, the sleeve 67 projects above the top of the stationary sleeve 66. A substantially L-shaped motor mounting bracket 71 is fixedly secured to the top of the reciprocatory sleeve 67, and a suitable electric drive motor 72 is rigidly mounted upon the bracket 71. The armature shaft of the motor 72 is equipped with a pulley 73, and a belt 74 connects the pulleys 73 and 70 for driving the spindle 69. A head or chuck 75 is secured to the bottom end of the spindle 69, and this chuck detachably receives a suitable engraving tool or bit 76 of the router type.

Means are provided to regulate the depth of cut of the engraving tool 76. Such means comprises a vertically swingable yoke 77 including laterally spaced, parallel arms or rods 78 arranged upon opposite sides of the sleeve 66. The rods 78 are connected at one end with a transverse rock shaft or pin 79 rigidly secured to the rods. This rock shaft 79 has a spur gear 80 rigidly secured thereto, and disposed within an extension or boss 81 formed upon one side of the fixed bushing or sleeve 66. The spur gear 80 engages gear teeth 82 formed upon one side of the vertically reciprocatory sleeve 67. The opposite ends of the rods 78 are connected by means of a transverse plate 83, and the yoke 77 further includes an integral, longitudinal extension or rod 84 rigidly secured to the plate 83 at the transverse center of the plate. The extension or rod 84 projects radially outwardly of the head 62, Figure 3, and carries an adjusting screw 85 operating within a screw-threaded boss 86 of the rod or extension 84. The adjusting screw 85 extends below the extension 84 and engages upon a radial extension or stop 87, in turn rigidly mounted upon the head 62. A compressible coil spring 88 surrounds the adjusting screw 85 above the boss 86, and bears against the head of the adjusting screw, so that the screw will not tend to become displaced after it is placed in a selected, adjusted position. It is thus seen that by manipulating the adjusting screw 85 and thereby swinging the yoke 77 vertically, the gear 80, through coaction with the gear teeth 82, will cause the bushing 67 to be adjusted vertically, thereby regulating the depth of cut of the engraving tool or bit 76. A set screw 67' may be provided for locking the sleeve 67 in selected adjusted positions. A rough adjustment of the depth of cut of the engraving tool may be obtained by manipulating the swivel handle 28, as previously stated, but the fine adjustment of the depth of cut of the engraving tool is obtained through the adjusting screw 85 and associated elements.

Fixedly mounted within the bore 54 of the head 53 is bearing or sleeve 89, and fixedly mounted within this sleeve 89 is a second tube or sleeve 90. A shaft or rod 91 is slidably mounted within the bore of the sleeve 90 for reciprocation, and this rod 91 is provided near its top end with a head or stop 92. The lower end of the rod 91 is provided with an integral head or chuck 93 disposed below the bottom of the head 53 and having a diameter substantially larger than that of the rod 91. A tracing tool or bit 94 is mounted within the chuck 93, and preferably has a conically tapered point 95. An expansible coil spring 96 surrounds the rod 91 between the chuck 93 and the bottom of the sleeve 90, and this spring serves to urge the rod 91 downwardly vertically. A substantially horizontal link or lever 97 has its outer or free end engaging beneath the stop 92 of the rod 91 for limiting the downward movement of the rod 91. This link 97 is pivotally mounted between its ends, as at 98, upon a fixed arm or support 99 rigidly secured, as at 100, to the mounting bracket 65. The lever 97 includes an upstanding extension or arm 101 having its top end extending above the bar 61, Figure 1, where it is pivotally connected, as at 102, with the rear end of a lever or link 103, in turn pivotally connected between its ends, as at 104, with a short, upstanding post or bracket 105 rigidly secured to the top of the bar 61. The member 103 has its free end 106 engaging upon the top of the plate 83, Figure 3, and the arrangement is such that the vertical adjustment of the engraving bit 76, by means of the adjusting screw 85 and associated elements, will also cause vertical adjustment of the tracing bit 94. Thus, when the yoke 77 is swung upwardly, Figure 3, the sleeve 67 will be raised for elevating the bit 76. Simultaneously, the arm or lever 103 will be swung upwardly and the rear end of this arm at 102 will shift downwardly, swinging the free end of the lever 97 upwardly about its pivot 98, Figure 1. This will cause the rod 91 and tracing tool 94 to be elevated. The spring 96 will maintain the head 92 in frictional contact with the lever or arm 97 at all times, so that there will be no lost motion or play in the linkage. The tools or bits 76 and 94 are shifted through a slight distance only by means of the adjusting screw 85, and the major vertical adjustment is achieved by manipulating the handle 28 and associated elements, as previously stated.

In use, the steel engraving or the like to be traced or duplicated is secured to the top of the tracing table 21. A separate engraving plate to have the engraving duplicated thereon is secured to the top of the engraving table 29. The handle 28 is now turned for elevating the tables 21 and 29 as a unit to approximately the proper elevation for the engraving plates to contact the points of the tools or bits 76 and 94. Further fine vertical adjustment may be achieved by the use of the adjusting screw 85. The motor 72 may now be started for rotating the engraving tool or bit 76. The head 53 is now grasped by the hand and the tracing tool 94 is guided about or along the various lines of the engraving which is to be traced or duplicated. The plates or tables 41 and 42, together with the bars 52 and 61, will move freely horizontally in any direction, depending upon the wish of the user. The extent of movement of the tracing tool 94 in the horizontal direction is limited only by the extent of travel of the pivoted link 55. As the tracing tool 94 traverses the engraving upon the table 21, the rotating engraving tool or router 76 will exactly duplicate the engraving upon the plate which is secured to the engraving table 29.

The machine is light weight in construction and extremely easy to manipulate. The arrangement of the ball bearings 36 and 50 renders the movement of the heads 53 and 62 substantially frictionless. As previously stated, the spring pressed ball bearing 50 prevents any vertical movement or play of the tables 41 and 42 while the heads 53 and 62 are being shifted in the horizontal plane.

While I have shown and described the machine in connection with the duplication of steel engravings and the like, I do not wish to limit the invention to this particular use, and it is obvious that the machine may be employed for reproducing patterns in wood panels, plastic sheets and the like.

It is to be understood that the form of the invention herewith shown and described is to be taken as a preferred example of the same, and that various changes in shape, size and arrangement of parts may be resorted to without departing from the spirit of the invention or the scope of the subjoined claims.

Having thus described the invention, I claim:

1. In a duplicating engraving machine, a support, horizontal tracing and engraving tables mounted on said support, said tables being in superimposed and fixed relation, a bearing assembly mounted on said support in laterally spaced relation to said tables, said bearing assembly comprising a horizontal bearing plate arranged to move freely in all directions in a horizontal plane relative to said support and said tables, a rigid frame fixed on said bearing plate and movable therewith, a first horizontal bar fixed on said frame and extending toward said tables, said first bar having a free end overlying said engraving table, a second horizontal bar fixedly mounted on said bearing assembly and extending toward said tables, said second bar having a free end overlying said tracing table, an engraving head on the free end of said first bar having a vertically movable engraving point, a tracing head on the free end of said second bar having a vertically movable tracing point, means operatively connected between the engraving and tracing points and acting to condition vertical movement of the engraving point in response to vertical movement of the tracing point, said bearing assembly further comprising another relatively stationary bearing plate located beneath the first-mentioned bearing plate, a base plate spaced beneath and carrying said other bearing plate, said base plate being mounted on said support, a ball bearing located in the space between said base plate and said other bearing plate and supporting said other bearing plate for free movement in a horizontal plane relative to said base plate in all directions.

2. In a duplicating engraving machine, a support, horizontal tracing and engraving tables mounted on said support, said tables being in superimposed and fixed relation, a bearing assembly mounted on said support in laterally spaced relation to said tables, said bearing assembly comprising a horizontal bearing plate arranged to move freely in all directions in a horizontal plane relative to said support and said tables, a rigid frame fixed on said bearing plate and movable therewith, a first horizontal bar fixed on said frame and extending toward said tables, said first bar having a free end overlying said engraving table, a second horizontal bar fixedly mounted on said bearing assembly and extending toward said tables, said second bar having a free end overlying said tracing table, an engraving head on the free end of said first bar having a vertically movable engraving point, a tracing head on the free end of said second bar having a vertically movable tracing point, means operatively connected between the engraving and tracing points and acting to condition vertical movement of the engraving point in response to vertical movement of the tracing point, said bearing assembly further comprising another relatively stationary bearing plate located beneath the first-mentioned bearing plate, a base plate spaced beneath and carrying said other bearing plate, said base plate being mounted on said support, a ball bearing located in the space between said base plate and said other bearing plate and supporting said other bearing plate for free movement in a horizontal plane relative to said base plate in all directions, and a bracket fixed on said support and having a ball bearing engaging the upper side of the first-mentioned bearing plate and precluding upward movement thereof relative to said support.

SAUL C. BARONE.

References Cited in the file of this patent
UNITED STATES PATENTS

| Number | Name | Date |
|---|---|---|
| 82,430 | Merrill | Sept. 22, 1868 |
| 384,995 | Moore | June 26, 1888 |
| 387,595 | Moore | Aug. 7, 1888 |
| 426,408 | Dodds | Apr. 22, 1890 |
| 429,213 | Jacobson | June 3, 1890 |
| 453,487 | King | June 2, 1891 |
| 885,423 | Brierley | Apr. 21, 1908 |
| 1,551,648 | Eaton | Sept. 1, 1925 |
| 1,561,214 | Bush | Nov. 10, 1925 |
| 1,615,261 | Edmunds | Jan. 25, 1927 |
| 1,617,632 | Gillespie | Feb. 15, 1927 |
| 1,696,032 | Glover | Dec. 18, 1928 |
| 1,748,591 | Uschmann | Feb. 25, 1930 |
| 1,907,250 | Shaver | May 2, 1933 |
| 2,161,709 | Henkes | June 6, 1939 |
| 2,178,130 | Zwick | Oct. 31, 1939 |